United States Patent
Laurent et al.

[11] 3,713,085
[45] Jan. 23, 1973

[54] ACOUSTIC WAVE RECEIVER FOR UNDERWATER SEISMIC PROSPECTING

[75] Inventors: Jean Laurent, Saint Germain en Laye; Claude Duconge, Le Vesinet, both of France

[73] Assignee: Institut Francais du Petrole, des Carburants et Lubrifiants, Rueil Malmaison, France

[22] Filed: Dec. 29, 1970

[21] Appl. No.: 102,416

[30] Foreign Application Priority Data

Dec. 30, 1969 France.................................6945582

[52] U.S. Cl....................................................340/7
[51] Int. Cl................................................G01v 1/20
[58] Field of Search...........................................340/7

[56] References Cited

UNITED STATES PATENTS

| 3,531,760 | 9/1970 | Whitfill, Jr.............................340/7 R |
| 2,757,355 | 7/1956 | Howes et al. .........................340/7 R |

Primary Examiner—Benjamin A. Borchelt
Assistant Examiner—R. Kinberg
Attorney—Craig, Antonelli, Stewart & Hill

[57] ABSTRACT

Acoustic wave receiver for underwater seismic prospecting comprising a plurality of tubular sections filled with liquid and containing coupled pressure sensors, at least one impedance adapter, electric wires interconnecting said sensors, a multiconductor cable and towing cables, end couplers at the extremities of section comprising means for anchoring the towing cables and means for electric connection to the multiconductor cable, said sections being coupled by means of coupling sleeves surrounding the end couplers in a tight manner.

5 Claims, 10 Drawing Figures

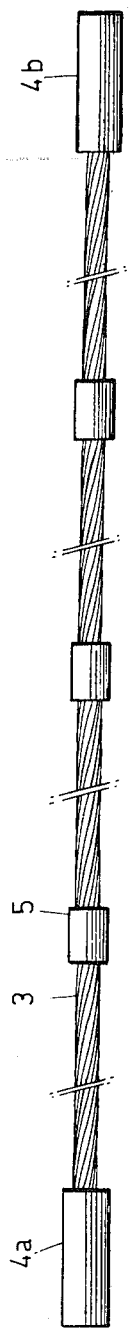
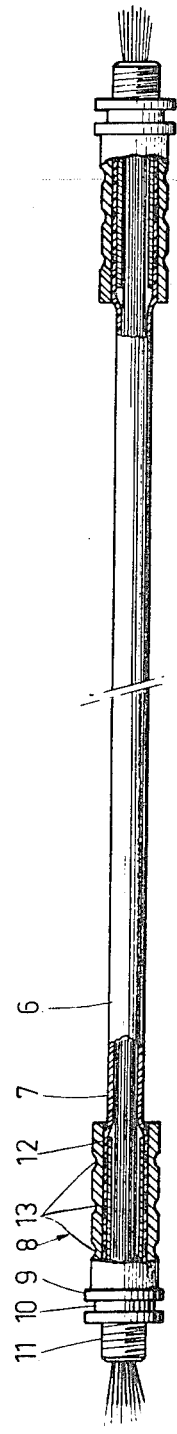

PATENTED JAN 23 1973 3,713,085

ACOUSTIC WAVE RECEIVER FOR UNDERWATER SEISMIC PROSPECTING

This invention relates to underwater seismic prospecting using a receiver for the acoustic waves generated from a sonic source after reflection on the reflecting strata of the submerged soil.

The invention is more particularly concerned with a receiving device wherein the pressure sensors are distributed at selected intervals along an immersed elongated casing filled with liquid and usually called a streamer.

The streamers are formed from an assembly of sections coupled end-to-end and which house hydrophones with traction cables and electric conductors interconnecting the hydrophones.

These different sections must be adapted for a simple and quick connection to one another and be easily replaceable. Moreover the connection between the electric conductors of two adjacent sections must be effected in an electrically insulated zone.

Amongst the most common embodiments of streamer sections there will be mentioned those wherein each group of pressure sensors is positioned by means of collars surrounding the casing or by fastening to the towing cables. The fastenings may be achieved for example by providing in a sensor-supporting member passageways for the cables on which sleeves are subsequently set on both sides of the supporting member. Another mode of fastening consists in gripping the cables between deformable elements secured to a sensor supporting member. The assembling and disassembling requires tools for clamping or removing the fastening members inserted on the support member of the sensors.

The method for connecting two adjacent sections consists in most cases in introducing the end part of each section in a coupling sleeve. The fastening is insured by external collars. Towing cables and electric conductors connecting the sensors of two adjacent sections are interconnected inside the sleeve which is filled with oil. The main disadvantage of this type of coupling is in the fact that the connectors of the electric conductors are not insulated against short circuits which might result from an accidental intrusion of water at any place of a section and are in contact with the oil. Moreover the towing cables and the electric conductor cannot be easily disassembled. In some cases the disassembling can not be made without a partial destruction of the constituting elements of the assembly.

It is therefore an object of this invention to provide a new seismic streamer wherein :

a. the elements are prefabricated, interchangeable and permutable and they are easy to assemble and disassemble,
b. the coupling members of any pair of adjacent sections are provided with a strictly tight housing wherein are connected the electrical conductors,
c. the towing cables contained in each section are connected in a simplified manner to each coupling member joining two adjacent sections.

In the device of the invention each section comprises a multi-conductor electric cable provided with a sleeve near each of its end parts, said sleeve having a head.

Moreover each section terminates at each end thereof with an end coupler having two recesses or cavities separated by a bearing formed by an inner protrusion of the wall thereof, and on which the head of the sleeve of the multi-conductor cable comes to rest.

The towing cables of each section are associated with anchoring means secured within the end coupler at the region of a first cavity. The selected anchoring means make possible a rapid and particularly simple assembling operation.

For the connection of the multi-conductor cables with one another, the conductors of each cable are joined to a connector fastened at a predetermined angular position to the end of the coupler portion containing the second cavity.

The device further comprises a coupling sleeve having an internal section substantially equal to the external section of the coupler portion containing the second cavity. Each coupler is introduced in the sleeve with a predetermined angular position and secured in such position.

This assembling manner insures a particularly simple and accurate guiding and fitting of the connectors.

The end part of the sleeve of the multi-conductor cable comprises means for fastening the head thereof to the bearing of the coupler said means being detachable without deterioration of the different parts.

Finally the joining of the connectors is carried out in an electrically insulated zone by making the second cavity tight to the liquid contained in the section and to the medium external to the receiver through sealing means associated to the head of the multi-conductor cable and placed on the external surface of the coupler end contained in said coupling sleeve.

The advantages of the present invention will be more fully understood from the following description illustrated by the accompanying drawings wherein :

FIGS. 1 A and 1 B show the two traction cables contained in each section of the seismic streamer;

FIG. 2 shows the multi-conductor cable provided at each end with fastening and sealing means;

Figure 3:
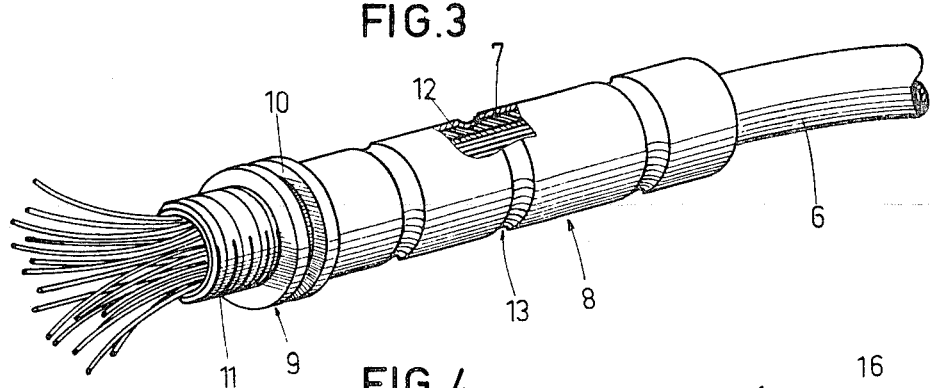
FIG. 3 shows more in detail each fastening and sealing means of the cable of FIG. 2.

Referring now more specifically to FIGS. 1 A and 1 B illustrating two towing cables 1 and 3, respectively, there is shown the cable 1, at both ends, cylindrical steel sleeves 2 a and 2 b which may, for example be set on the cable by stamping.

The cable 3 is also provided at both ends with sleeves 4 a and 4 b, but also with further intermediate sleeves at regular intervals corresponding to the selected spacing between the pressure sensors, said intermediate sleeves being fastened to the cable, for instance by setting.

The multi-conductor cable 6 shown in FIGS. 2 and 3 insures the transmission of the electric signals issued from the sensors distributed along the streamer. The cable is formed of conductors contained in a sheath 7 of constant thickness, made, for example of plastic material.

On each end of this cable 6, of a length slightly greater than that of the section, is fitted a metal sleeve 8 having a head 9 provided with a circular groove 10 wherein a toric joint can be received or housed. The head 9 is extended with a threaded portion 11. A ring 12 is imbedded into the sheath 7 and the sleeve is drawn on the sheath. The fastening means also insures the sealing of the conductors from the oil contained in the sheath. A certain sheath length is cut off at each end so as to have the ends of the conductors extending there from.

Figure 4:
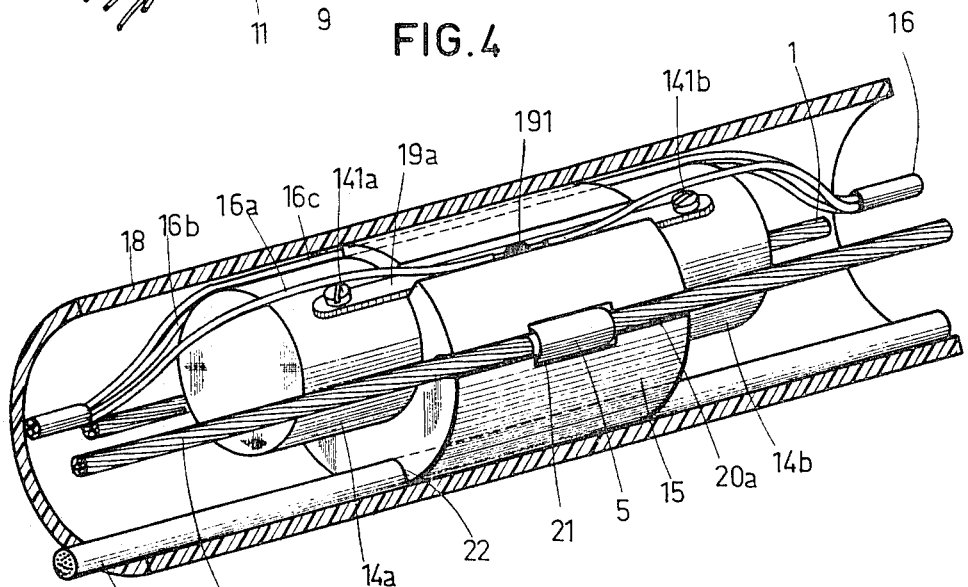
FIG. 4 is a diagrammatic view of the arrangement of each group of pressure sensors inside each section.
Figure 5:
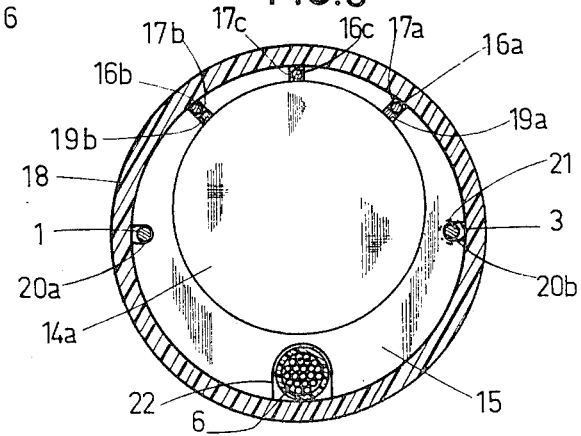
FIG. 5 is a side view showing the arrangement of each group of pressure sensors inside each section.

In FIGS. 4 and 5 the pressure sensors 14 a and 14 b are grouped by pairs and associated with sleeves 5 distributed over the length of cable 3. The pressure sensors may be, for example, of the type described in the described in the U.S. Pat. application Ser. No. 727,953 filed on May 9, 1968, and are connected to a strand of three conductors 16a, 16b, and 16 c which may be subjected to series or parallel grouping combinations.

Sensors 14 a and 14 b are associated with an intermediate element 15, e.g of plastic material, having a diameter substantially equal to the inner diameter of the sheath 18 covering each streamer section.

Grooves 17 a, 17 b, and 17 c (FIG. 5) are provided in element 15 in a direction parallel to the axis of the streamer section, forming a passage way for the conductors 16a, 16 b, and 16 c. The output terminals 141a and 141 b (FIG. 4) of the two sensors are interconnected with a rod 19 a, passing through the groove 17 a. The conductor 16 a is electrically connected about at mid-way 191 of said rod. Similarly the two opposite output terminals of the two sensors are connected through a rod 19 b having substantially at mid-way thereof the conductor 16 b electrically connected.

Grooves 20 a and 20 b (FIG. 5) are provided over the whole length of element 15 and on the periphery thereof for the passage of cables 1 and 3. Moreover a housing opening or recess 21 for receiving the sleeve 5, fastened to cable 3, is provided in element 15. The sleeve 5 is introduced therein, thereby anchoring the group of sensors in a steady location.

Another housing opening 22, provided along the whole length of element 15, forms a passageway for the multiconductor cable 6.

Each section also comprises a transformer and a preamplifier for impedance matching, which are not shown in the figures. These elements and more generally all the measuring instruments housed in the sheath, are secured to support members similar to element 15 and provided with grooves such as 17, 20 and 22 and housing openings as 21.

These grooves and housing openings make possible a quick assembling and disassembling of the cables and the conductors which are maintained separate from one another and cannot therefore be wound up or commingled during the streamer reeling or unreeling operations.

Figure 6:
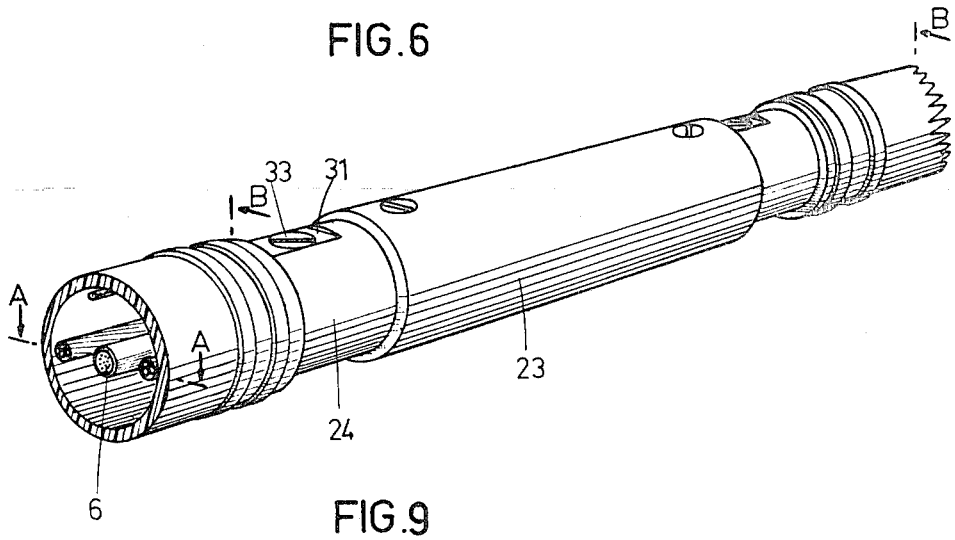
FIG. 6 is a perspective view of the coupling members fastened to each end of the seismic streamer sections.
Figure 7:
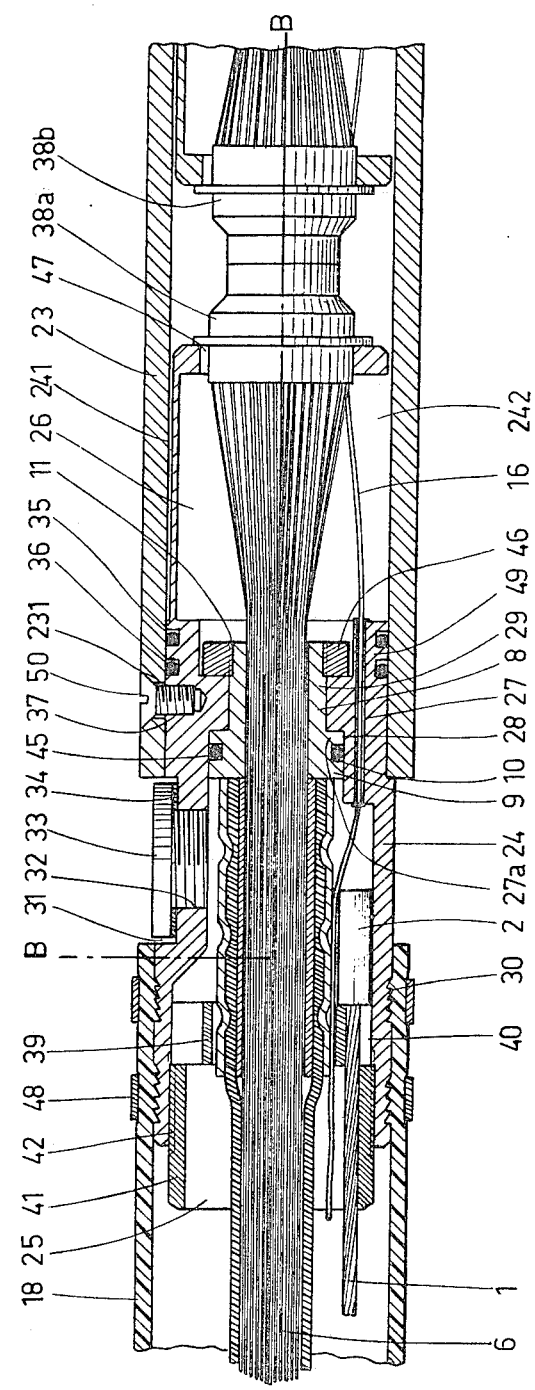
FIG. 7 is a cross-sectional view along line AA and partially along BB of the assembly of the coupling members illustrated in FIG. 6.

As shown in FIGS. 6 and 7, the end of the streamer section contained in the sheath 18 is connected to a cylindrical coupling sleeve 23 through an end coupler 24, which is also cylindrical.

This end coupler 24 comprises two cylindrical recesses or cavities 25 and 26 separated by a bearing 27 comprising two cylindrical surfaces 28 and 29 separated by a shoulder 27 a. The surface 28 has an inner diameter substantially equal to the outer diameter of the head 9 of the multiconductor cable end coupler. The surface 29 has an internal diameter substantially equal to the external diameter of the threaded portion 11 of said end coupler.

The external surface of the end coupler 24 is provided with transverse corrugations 30 in front of recess 25 and its diameter is slightly greater than the internal diameter of sheath 18. The wall of the end coupler 24 comprises, on a part of its length, a flat part 31 having a threaded orifice 32 opening inside the end coupler 24 and in which is fitted a plug 33 (FIGS. 6 and 7) and a sealing joint 34 (FIG. 7).

In the external surface of the end coupler 24, in the vicinity of the bearing 27, there are provided grooves 35 for receiving toric sealing joints 36 and a threaded housing opening 37 for receiving a screw. Finally, at the end 241 of the end coupler 24, on the side of recess 26 there is arranged an electric connector 38 a.

The external diameter of the end coupler 24, at the region of recess 26, is substantially equal to the internal diameter of the coupling sleeve 23.

The latter comprises a number of orifices 231 equal to the number of threaded housing opening 37.

Figure 9:
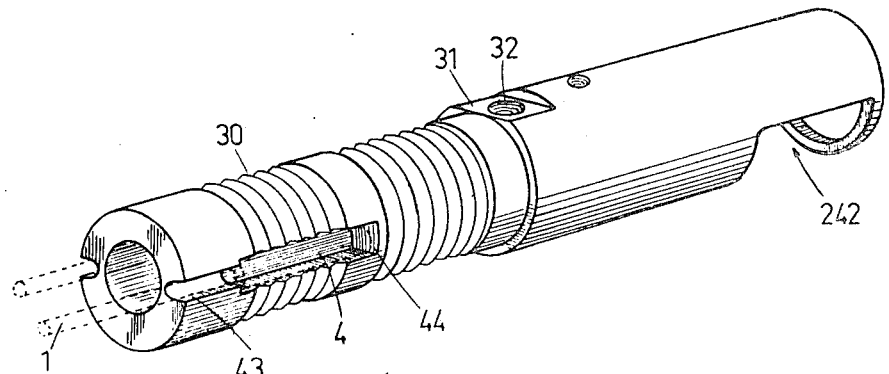
FIG. 9 illustrates another embodiment of anchoring and fastening of the towing cables.
Figure 8:
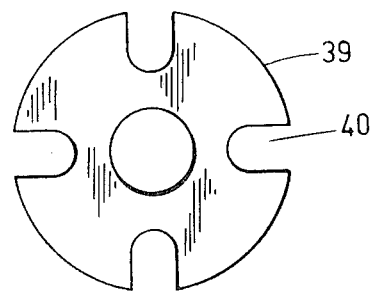
FIG. 8 is a front view of the metal pieces for the anchoring of the towing cables.

The coupling of the towing cables 1 and 3 to the end coupler 24 is described with references to FIGS. 7, 8 and 9.

The towing cables 1 and 3 are introduced into the recess 25 of the end coupler (FIG. 7).

An anchoring element 39 (FIG. 8) of a diameter substantially equal to the diameter of recess 25 and comprising housing openings in which cables 1 and 3 are slidable, is introduced in the end coupler and locks the sleeves 2 and 4 set on the ends of these cables. This anchoring element is fastened by screwing of a nut 41 on the threaded end 42 of the end coupler 24.

A preferred fastening way is that illustrated in FIG. 9. In the external surface of the extremity of the end coupler 24, on the side of recess 25 and in a diametral plane, are arranged two grooves 43 for the passage of cables 1 and 3 and two housings 44 for the sleeves 2 and 4.

The advantages of the invention will be better understood from the following description of the assembling of streamer sections and their coupling.

The sleeve 8 of cable 7, provided with a toric joint 45 (FIG. 7) placed in the groove 10, is introduced into the end coupler 24 up to the bearing 27 and is locked with a nut 46. The conductor bundle in extension of the sleeve is wired on the connector 38 a secured to the extremity 241 of the end coupler 24. A marking pin 47 insures the right angular positioning of the connector. In order to make easier the cable setting of the bundle on the connector, port holes 242 (FIGS. 7–9) can be provided in the external surfaces of the end coupler 24.

The towing cables are fastened through the anchoring element 39 and the nut 41.

Each group of pressure sensors is positioned along the section by introduction of each sleeve 5 into the housing opening 21 arranged in each element 15 (FIG. 4). The towing cables and the three conductors of each strand 16 are introduced into the corresponding grooves of each element 15 and kept in position for example by means of metal or plastic collars or of thermoretractable sleeves not shown in the figures.

The assembly formed of the towing cables, the conductors, the pressure sensors and the transformer or the impedance adapter-amplifier is then covered with a sheath of plastic material 18, the ends of which are drawn on the extremity of the end coupler 24 (FIG. 7), provided with corrugations and gripped by collars 48.

Conductors 16, connected to the transformer or to the impedance adapter-preamplifier, are introduced into the end coupler 24 and wired on the electric connector 38. They pass through the bearing 27, through one or more channels 49, the sealing of which is achieved by a joint, a packer or by filling with a sealing material (no sealing means is shown in the figures).

The towing cables are introduced into the end coupler and fastened as above described.

The extremity of the end coupler 24 opposite to the sheath 18 of one section is then introduced into the coupling sleeve 23. The fastening and angular positioning of these two elements are achieved by means of screws 50 after the orifices 231 have been made to register with the threaded housing openings 37. The end coupling of the other section is then introduced in and slided through the sleeve 23 in the same manner by bringing in coincidence the respective axes of housing openings 37 and orifices 231. The electric connectors 38 a and 38 b, guided by the extremities 241 of the end couplers on which they are secured and positioned by means of the marking pins 47, fit each other automatically.

Finally the seismic streamer section is filled with oil via orifice 32. In order to facilitate the filling and emptying, the plug 33 may be provided with a needle adjusting screw or a non-return valve. The plug 33 may also be replaced by a valve directly secured on the end coupler 24.

It is noted that the electric connectors are contained in a housing which is insulated from the external water by means of sealing joints 36 and insulated from the oil filling the cavity 25 by means of sealing joint 45.

It is also to be observed that the simplicity of the assembling of the device makes easy the replacement or permutation of streamers sections.

It must be understood that the specific arrangement described for the fastening of the towing cables to the groups of pressure sensors is not a limitation of the invention, since it is also possible to make use of a single sensor per group, to have one or more cables in each section and to fasten the sensor to one or more cables in the described manner.

More generally it is clear that, from the foregoing description, one skilled in the art, can easily ascertain the essential characteristics of the invention and, without departing from the spirit and scope thereof, can make various changes and modifications of the invention to adapt it to various usages and conditions. Consequently, such changes and modifications are properly, equitably and intended to be within the full range of equivalence of the following claims.

What we claim as this invention is:

1. An acoustic wave receiver for underwater seismic prospecting comprising a plurality of tubular sections filled with liquid and containing coupled pressure transducers, electric conductors interconnecting the transducers, a multiconductor electric cable having a tight sleeve adjacent each end thereof and an electrical connector arranged at each end, towing cables and coupling means for interconnecting the tubular sections, said coupling means including couplers secured to the ends of the tubular sections, each coupler having a wall with an internal protrusion forming a bearing and first and second recesses separated by said bearing, means for anchoring the ends of the towing cables, said anchoring means being secured within the coupler at the region of the first recess, means for connecting the electrical connector in a predetermined angular position substantially at the end portion of the coupler containing the second recess and removable means for fastening the sleeve of the multiconductor cable to said bearing, said coupling means also including a coupling member for interconnection of the couplers, said coupling member having an internal section substantially equal to the external section of the end of the coupler containing the second recess and having additional means for the angular positioning and fastening of each coupler, and sealing means associated with the external wall of the sleeves of the multiconductor cable and with the end of the coupler contained in the coupling member for insulating said second recess of the coupler from the internal liquid of the tubular sections and from the surrounding water.

2. An acoustic wave receiver according to claim 1, wherein the transducers are externally secured to support members substantially fitted to the internal diameter of each tubular section, said support members having grooves arranged in the lateral wall thereof forming a passageway for the electric conductors and the towing cables, and at least one housing opening being provided in the lateral wall of said support members for receiving anchoring elements secured onto at least one of the towing cables.

3. An acoustic wave receiver according to claim 1, wherein said anchoring means for the ends of the towing cables comprise housing openings arranged in the external wall of each coupler for receiving anchoring elements secured to the ends of the towing cables.

4. An acoustic wave receiver according to claim 1, wherein each coupler comprises at least one channel for the passage of the electric conductors of the tubular section connected with the electrical connector in the region of the second recess of the coupler.

5. An acoustic wave receiver according to claim 1, wherein the sleeves of the multiconductor electric cable comprise a head portion for abutment against the protrusion of the coupler, said head being provided with recesses for the sealing means.

* * * * *